(No Model.)
G. E. DORMAN.
DYNAMO ELECTRIC MACHINE.
No. 472,943. Patented Apr. 12, 1892.
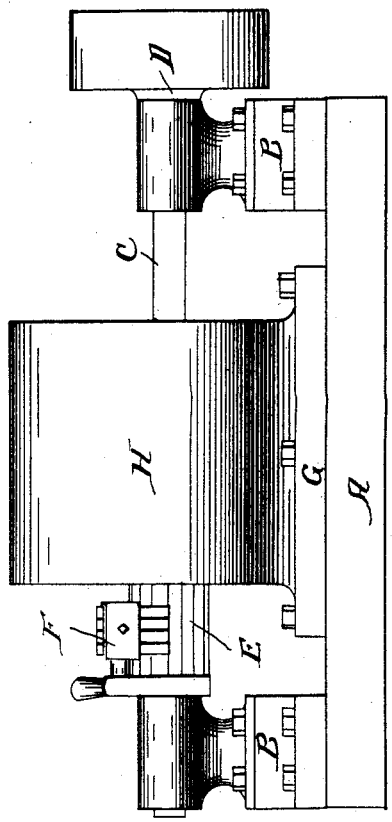
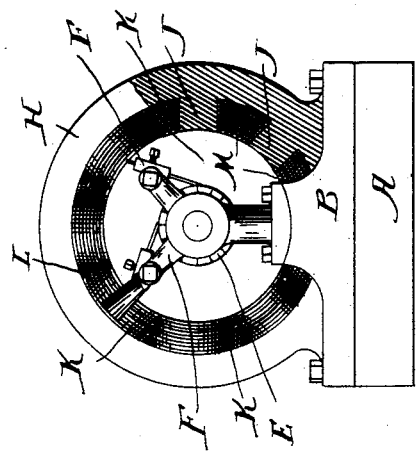
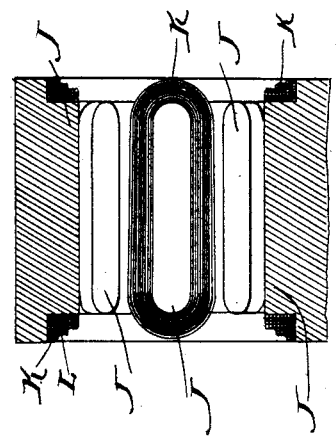
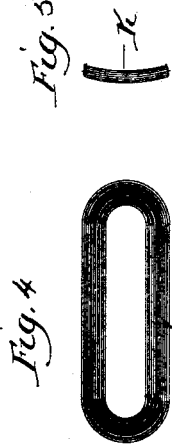
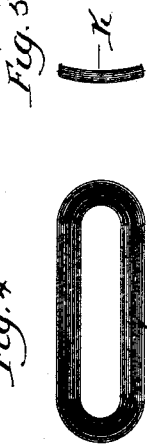
Witnesses:
Celeste P. Chapman.
Harriet M. Day.
Inventor
George E. Dorman.
Francis W. Parker,
Attorney.
THE NORRIS PETERS CO., PHOTO-LITHO., WASHINGTON, D. C.

UNITED STATES PATENT OFFICE.

GEORGE EDWARD DORMAN, OF CHICAGO, ILLINOIS, ASSIGNOR TO THE STANDARD ELECTRIC COMPANY, OF ILLINOIS.

DYNAMO-ELECTRIC MACHINE.

SPECIFICATION forming part of Letters Patent No. 472,943, dated April 12, 1892.

Application filed December 17, 1890. Serial No. 374,993. (No model.) Patented in England April 17, 1889, No. 6,570.

*To all whom it may concern:*

Be it known that I, GEORGE EDWARD DORMAN, a subject of the Queen of Great Britain, residing at Chicago, in the county of Cook and State of Illinois, have invented a certain new and useful Improvement in Dynamo-Electric Machines, (for which I have obtained Letters Patent in England, No. 6,570, of April 17, 1889,) of which the following is a full, clear, and exact specification.

My invention relates to dynamo-electric machines, and has for its object to provide certain new and useful improvements, more particularly with reference to a cylindrical field-magnet machine. It is illustrated in the accompanying drawings, wherein—

Figure 1 is a side view of the machine. Fig. 2 is an end view with a certain portion shown in section. Fig. 3 is a cross-section through the field-magnet. Figs. 4 and 5 are details of the field-magnet coils.

Like parts are indicated by the same letters in all the figures.

A is a bed-plate. B B are the standards thereon, on which is journaled the armature-shaft C, carrying the pulley D, and the commutator E, upon which rest the brushes F F.

G is the piece upon which the field-magnet H is supported. This field-magnet H is composed of the exterior cylindrical portion and inwardly-projecting pole-pieces J J, shaped substantially as shown, or, in other words, pole-pieces which project radially toward the axial line of the cylindrical field-magnet and are oblong. In winding such pole-pieces some difficulty has been experienced, and it has particularly been difficult to utilize the space between the pole-pieces to the fullest degree for field-magnet coils. It is because the space between such pole-pieces is necessarily V-shaped in cross-section, with the narrowest portion toward the center. If, therefore, a single coil be placed upon this pole-piece, it must be shaped so that its inner end can pass onto its proper pole-piece after the two adjacent coils are in position on their respective pole-pieces, and when all the coils are in position a V-shaped space between such coils and pole-pieces will still remain. I wind a thin coil of wire K upon a former of size and shape corresponding to the pole-pieces, and when the same is complete it is shellacked or otherwise treated, so as to form a sort of mass, and this mass is then pressed, as indicated in Fig. 5, into a form to correspond with the curvature of the field-magnet body. The diameter of this coil is greater than the distance from midway between two poles to midway between the next two; but its thickness is much less, preferably one-third or one-fourth the length of the pole-piece. This coil so formed is now placed upon its proper pole-piece, and similar coils are placed upon all the other pole-pieces. I now form a series of coils L L of slightly less width, and these are in like manner placed upon their respective pole-pieces, and so the process continues until each pole-piece has been supplied with its full winding, and thus substantially all of the space between the pole-pieces is filled up with wire. In order that these coils may be held in position, a series of thin curved strips M M are driven in between adjacent pole-pieces and above the coils, and since these strips are forced between such pole-pieces and gripped by them the coils are all securely held in position.

I claim—

1. In a dynamo-electric machine, a series of inwardly-projecting pole-pieces, in combination with a series of coils about such pole-pieces, each of said coils being curved to conform with the surface of a cylinder, substantially as shown.

2. In a dynamo-electric machine, a field-magnet provided with a series of inwardly-projecting pole-pieces, each pole-piece provided with a series of successively-superimposed coils, each being curved to conform with the surface of a cylinder.

3. In a dynamo-electric machine, a field-magnet provided with a series of inwardly-projecting pole-pieces, each pole-piece provided with a series of successively-superimposed coils, each being curved to conform with the surface of a cylinder, and a series of thin strips inserted between adjacent pole-pieces and lying above the coils to keep them in position.

4. In a dynamo-electric machine, a cylindrical field-magnet with a series of inwardly-projecting pole-pieces radially positioned and oblong and provided each with a series of surrounding coils, each coil being curved to conform with the surface of a cylinder.

GEORGE EDWARD DORMAN.

Witnesses:
CELESTE P. CHAPMAN,
HARRIET M. DAY.